Sept. 2, 1924.                                                                1,507,265
                        J. J. THACHER
                       AUTOMATIC LATHE
        Original Filed May 17, 1920      6 Sheets-Sheet 2

Sept. 2, 1924.

J. J. THACHER

AUTOMATIC LATHE 1,507,265

Original Filed May 17, 1920    6 Sheets-Sheet 3

Inventor
John J. Thacher.
By S. Jay Teller
Attorney

Sept. 2, 1924.

J. J. THACHER

AUTOMATIC LATHE

Original Filed May 17, 1920    6 Sheets-Sheet 4

1,507,265

Sept. 2, 1924.

J. J. THACHER

AUTOMATIC LATHE

Original Filed May 17, 1920    6 Sheets-Sheet 5

Inventor
John J. Thacher.
By S. Jay Teller
Attorney

Patented Sept. 2, 1924.

1,507,265

UNITED STATES PATENT OFFICE.

JOHN J. THACHER, OF WETHERSFIELD, CONNECTICUT, ASSIGNOR TO PRATT & WHITNEY COMPANY, OF NEW YORK, N. Y., A CORPORATION OF NEW JERSEY.

AUTOMATIC LATHE.

Application filed May 17, 1920, Serial No. 381,945. Renewed January 8, 1924.

*To all whom it may concern:*

Be it known that I, JOHN J. THACHER, a citizen of the United States, residing at Wethersfield, in the county of Hartford and State of Connecticut, have invented certain new and useful Improvements in Automatic Lathes, of which the following is a specification.

This invention relates to improvements in automatic machines and in particular to improvements in automatic lathes of the type described in the patent to Müller 1,252,928, granted January 8th, 1918.

More especially this invention relates to improvements in the different parts of an automatic lathe such as shown in the above mentioned patent, particularly the driving means for the fast and slow speed for rotating the main cam shaft. Furthermore the invention relates to improved means for operating and controlling the blank transferring means to move the blank being operated on from the magazine to its operative position upon the centers.

A principal object of the invention is to provide an improved tool carriage and taper attachment co-operating therewith to permit the ready adjustment of the tool to cut either cylindrical or taper work or to cut a taper on the blank during a portion of the tool carriage movement and then, if desired, a cylindrical portion.

Also it is an object to provide improved attaching means for the taper attachment.

Another object of the invention is to provide means in the headstock to prevent the operator from shifting the speed controlling levers while the machine is in operation, this preferably taking the form of an interlocking slide which is moved to locking position by moving the belt from its idle to driving position.

A further object of the invention is to provide an improved controlling means for the machine which will enable the operator to stop the machine either immediately or at the conclusion of its cycle of operations.

In the accompanying drawings, I have shown an embodiment of the invention which I now deem preferable but it is to be understood that changes and modifications may be made within the scope of the appended claims without departing from the spirit of the invention.

Referring to the drawings annexed hereto and forming a part of of this specification.

In its entirety my invention comprises an automatic machine of the lathe type in which the piece or blank to be operated upon is held between live and dead centers and is rotated by means of a driving chuck. Generally, the machine comprises a bed which has mounted thereon at one end a headstock with a speed reducing gearing therein and at the other end a tailstock, this tailstock being operated by a suitable cam so as to engage the blank worked upon at a predetermined pressure and serving to clamp the dead or tailstock center securely in place to hold the blank on the centers. A tool carriage is operated by an appropriate cam for moving it longitudinally along the bed, and, in rear of the bed of the machine a suitable magazine is provided adapted to hold a number of blanks or pieces preparatory to being worked upon and also means for transferring or carrying one of the blanks from its position at the lower end of the magazine to its operative position between the centers of the lathe. Further, the automatic lathe comprises suitable driving means as shown coupled with the main driving means in the headstock to rotate the main cam shaft at different speeds. In the present instance, the driving means provide a high speed drive which is constant and a low speed which is proportional to the speed of the lathe spindle when cutting and at a greatly reduced speed relative to the high speed. The above mechanism will be described in detail as the specification proceeds.

Figure 1:
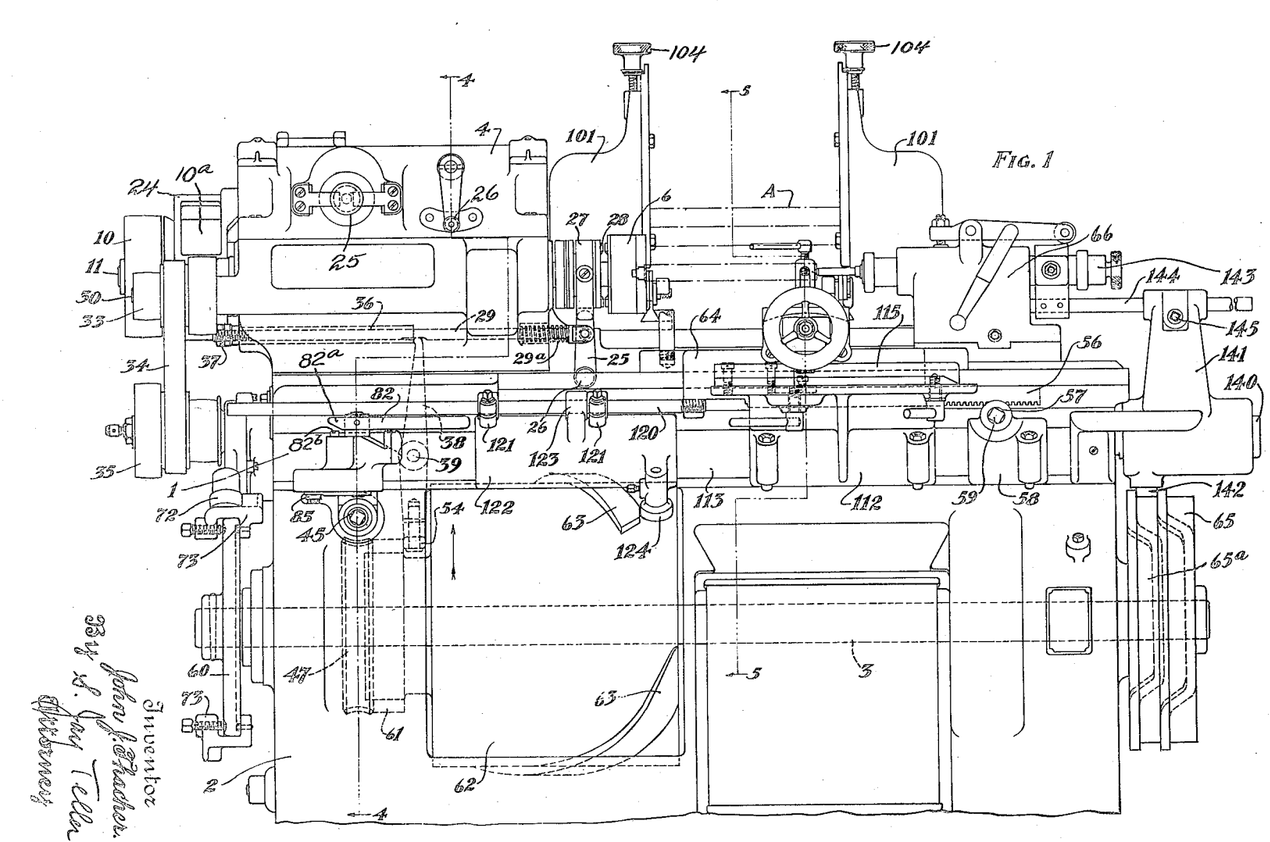
Figure 1 shows a front elevation of the complete machine with the cam shaft in one position.
Figure 7:
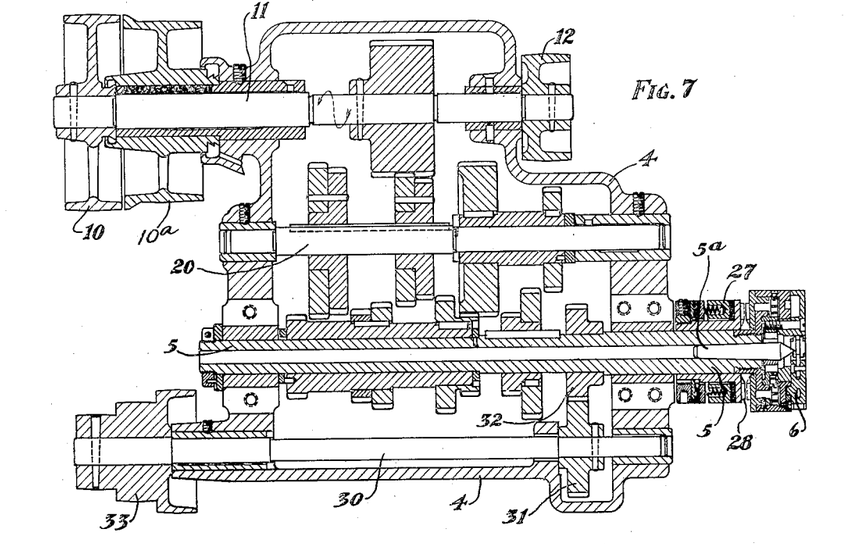
Fig. 7 a plan of the speed change gearing provided in the headstock shown in section.
Figure 8:
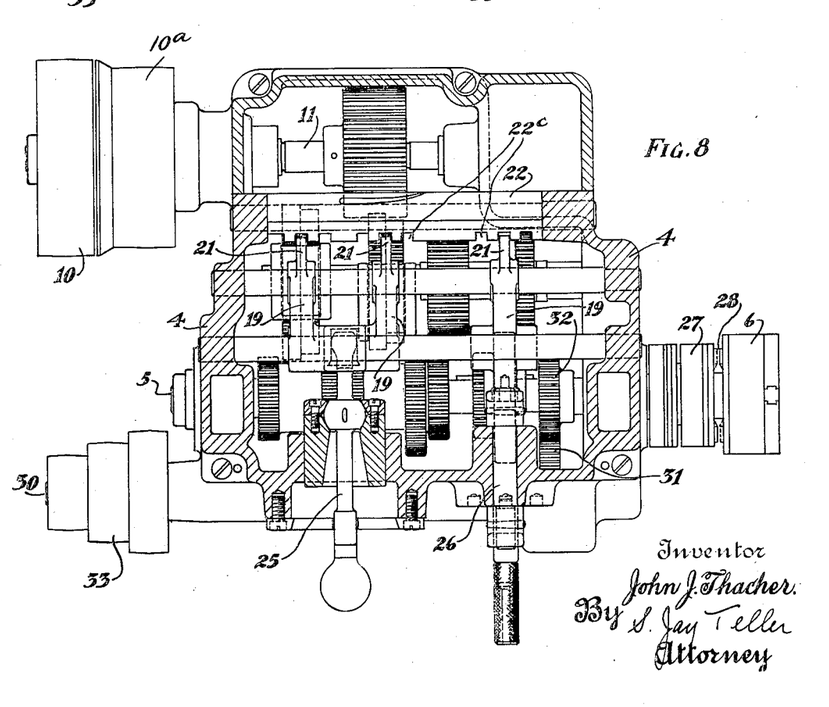
Fig. 8 another view of the same.

Referring now more particularly to the figures of the drawing, a bed 1 is shown surmounted on a base 2 in which operates a main cam shaft 3. As shown in Fig. 1, the main cam shaft 3 lies parallel with the lathe bed 1 and extends horizontally from end to end of the machine. Mounted upon one end of the bed 1 is a headstock 4 having a main spindle 5 to which the work rotating chuck 6 is mounted. As more fully described hereafter the chuck 6 is of the floating type and serves merely to rotate the blank being worked on without holding it in position. In order to hold the blank in fixed position the headstock spindle 5 is provided with a centre 5ª on which one end of the blank is positioned. In the headstock 4 as more particularly shown in Figs. 7 and 8, a main driving pulley 10 is provided which operates a driving shaft 11 provided in the rear portion of the headstock 4. Lying parallel to the main headstock spindle 5 and directly connected with the driving shaft 11 is a driving pulley 12 adapted to be connected by means of a belt 13 or other flexible connecting means with the driven pulley 14 to operate the main cam shaft 3 at its high speed by means presently to be described. Preferably an idler pulley 15 is provided contacting with the belt 13 which may be adjusted by oscillating its stud shaft 16 which is mounted on an arm 17 about the pivot 18 and clamping it in position to serve as a belt tightener. Intermediate between the driving shaft 11 and the headstock spindle 5 is a change gear shaft 20 provided with a plurality of gears of different diameters. Each of these gears is adapted to be engaged by a mating gear on the headstock spindle 5. Suitable levers 25 and 26 as shown in Fig. 8 are provided for sliding some of the gears on the intermediate shaft and headstock spindle into mesh with their mating gears to rotate the headstock spindle at variable speeds in the same direction. In the headstock 4 another shaft 30 is geared directly to the headstock spindle 5 by a pair of gears 31 and 32 and provided with a cone pulley 33. Connected with this cone pulley 33 by means of a belt 34 or other connection is a cone driven pulley 35 for operating the main cam shaft 3 at its low speed during the cutting operation.

As the speed change gear above described is similar to a usual form of change gear provided in geared headstock lathes, it will not be necessary to be further described. Suffice it to say that the mechanism provides eight different speeds at which the headstock spindle may be rotated in the same direction, any of which speeds may be selected by proper adjustment of the levers 25 and 26.

Referring to Figs. 2–4 and 8, the means for locking the sliding gears in position during the operation of the machine is shown. As shown in Fig. 8 the gears of the speed change mechanism are moved along their respective shafts by the adjustment of levers 25 and 26 and the movement of yoke members 19 adapted to slide in a direction parallel to the shaft 20 and spindle 5, each of these yoke members enclosing a pair of the sliding gears.

Figure 4:
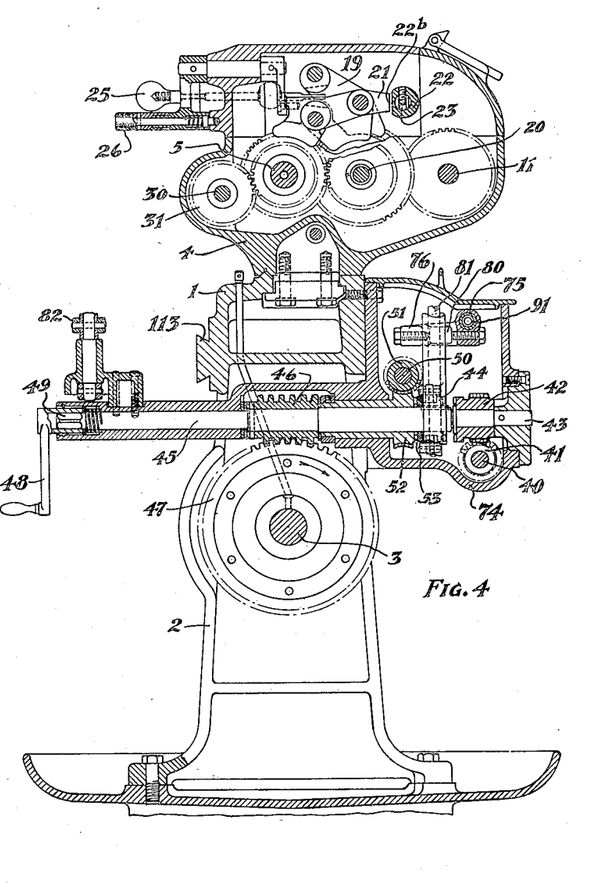
Fig. 4 a sectional elevation taken through the headstock along line 4—4 of Fig. 1.

The yoke members 19 are provided with rearward extending projections 21 as clearly shown in Figs. 4 and 8. These projections 21 extend to a point adjacent an oscillating sleeve 22 loosely mounted on the belt shipper shaft 23 carrying a belt shipper 24 at one end adapted to enclose a belt either on the main driving pulley 10 or the loose pulley 10ª. Movement of the belt shipper 24 operates the shaft 23 which carries a pin 23ª engaging and sliding in a cam slot 22ª provided in the sleeve 22. Movement of the belt shipper 24 and the action of the pin 23ª in the cam groove 22ª serves to oscillate the sleeve 22.

Referring to Fig. 4 it will be seen that the sleeve 22 is provided with a flat side 22ᵇ, which, when in one position permits longitudinal movement of the yoke members 19. Sleeve 22 is also provided with a series of depressions 22ᶜ shown in Fig. 8 one being provided for each position assumed by the projections 21 of the yoke members 19 when the position of the sliding gears is varied.

The operation of the interlock is as follows: When the main driving belt is on the loose pulley 10ª the sleeve 22 is in the position shown in Fig. 2 and the flat side 22ᵇ is adjacent the yoke member projections 21 so that the levers 25 and 26 may be operated. As soon as the belt shifter 24 has been moved to throw the belt on the driving pulley 10 the sleeve 22 is oscillated through about a right angle so that the slots or depressions 22ᶜ enclose the yoke member projections 21, thus securely holding the gears in locked position.

The driving mechanism for rotating the main cam shaft at its high speed comprises the shaft 11 above referred to upon which pulley 12 is mounted at one end. This, as above stated, is connected with pulley 14 on the driving shaft 40 by means of a suitable belt 13. On this driving shaft 40 is a worm 41 meshing with a worm wheel 42 mounted on a stud shaft 43 extending rearward and being secured in a plate fastened to the machine. This worm wheel 42 is freely rotatable about the shaft 43 and is provided with clutch teeth, so that it is adapted to be coupled to a clutch 44 mounted forward of the shaft 43, the position shown in Fig. 4 being the inoperative position for this worm wheel 42. By means of the worm 41 and the worm gear 42 above described, when engaged by the clutch 44, the shaft 45 is rotated at a high speed. On this latter shaft 45 is a suitable worm 46 engaging a corresponding worm gear 47 attached to the driving or main cam shaft 3.

In order to accomplish the slow or working speed of the cam shaft 3, the driving connections are as follows: On the cone pulley 33 mounted on the headstock 4 is a belt 34 connected to a corresponding cone pulley 35 geared by means of spur gears 35ª to a short longitudinal shaft 50 in rear of the lathe bed 1. About this shaft is provided a worm 51 meshing with a worm wheel 52 rotatably mounted on the rear end of shaft 45. The clutch 44 above described is adapted in its forward position to engage this worm wheel 52 through suitable clutch teeth 53 on its rear face, thus rotating the shaft 45 at a relatively low speed. As above described, the connection between the driving cone pulley 33 and this worm wheel is proportioned so that it causes a speed reduction for the driving shaft 45 and the cam shaft 3 is rotated at a much reduced speed compared with its speed when driven by the worm gear 42 and which may be varied readily by varying the position of the belt 34 on the cone pulleys 35 and 33. This slow speed for the cam shaft 3 is, moreover, dependent upon the position of the levers 25 and 26 and is directly proportional to the speed of the headstock spindle 5 for any one position of the belt 34.

As it is often necessary to operate the machine by hand independently of the power driving means above described manual means for rotating the cam shaft 3 have been provided. These comprise a forwardly extending portion of the worm shaft 45 which is squared as shown at 49 for engagement with a suitable crank 48. It is obvious that the shaft 45 can be rotated by hand to rotate the main cam shaft 3 and cause the machine operations to be accomplished with the exception of rotation of the work spindle 5 only when the clutch 44 is in its neutral or central position. To move the clutch 44 to neutral position it is only necessary to operate the handle 82 as will be more fully described further on.

The manual means for operating the cam shaft 3 above described provides a convenient method of operating the machine during the setting or adjusting of the cams along cam shaft 3 when the machine is being originally set up or adjusted for different work.

The cams provided on cam shaft 3 for accomplishing the operative functions of the parts of the machine will now be described.

Along the main cam shaft 3 are provided a plurality of disk or drum cams, each controlling one independent or separate operative motion or function of the machine, these cams are, first, a cam 60 to control the speed at which the shaft 3 is rotated; second, a cam 61 to open and close the work holding chuck; third, a cam drum 62 on which helical cam strips 63 may be located to control the reciprocations of the tool carriage 64; fourth, a cam 65 to operate the tailstock 66 and fifth (see Fig. 5) a cam 130 to operate the blank transferring mechanism.

Figure 2:
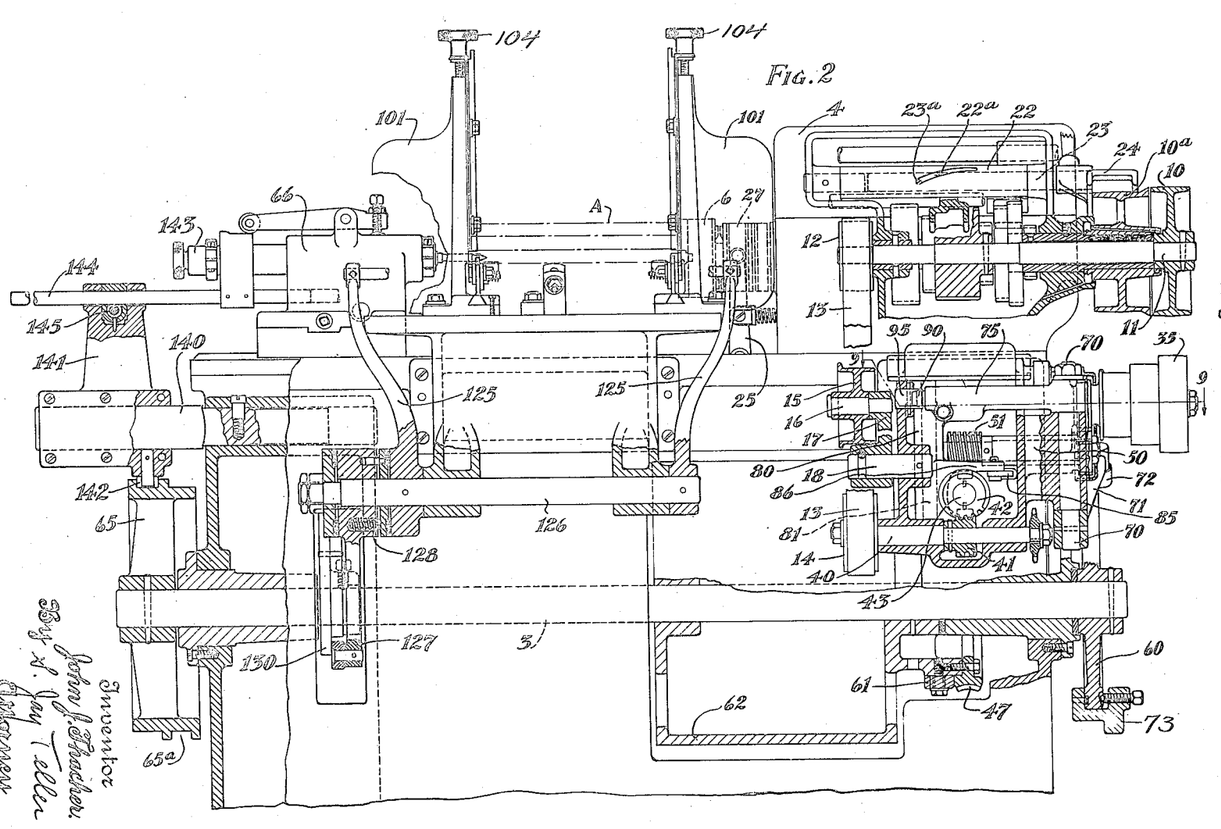
Fig. 2 a rear elevation of the complete machine, some of the parts being broken away more clearly to show their construction; the cam shaft being shown in a second position.
Figure 3:
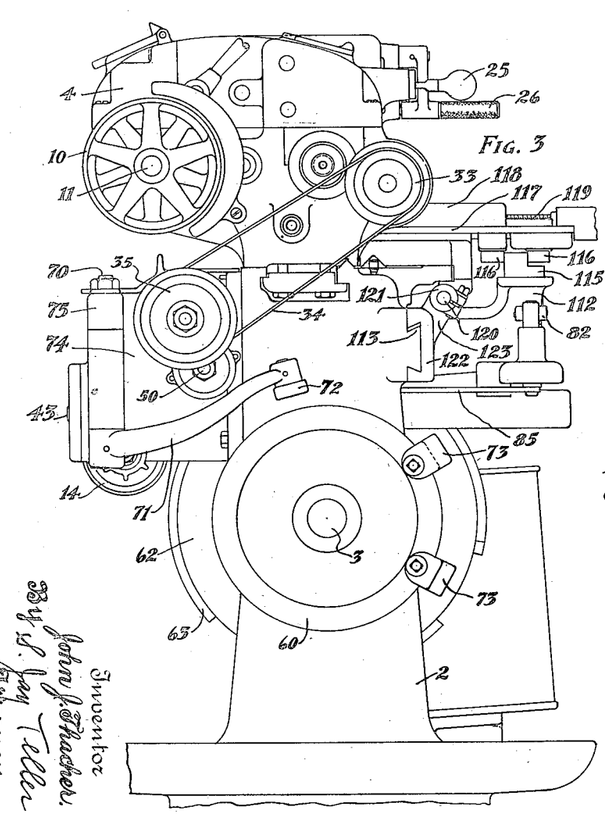
Fig. 3 an end elevation taken from the headstock end of the machine.
Figures 9, 10, 11:
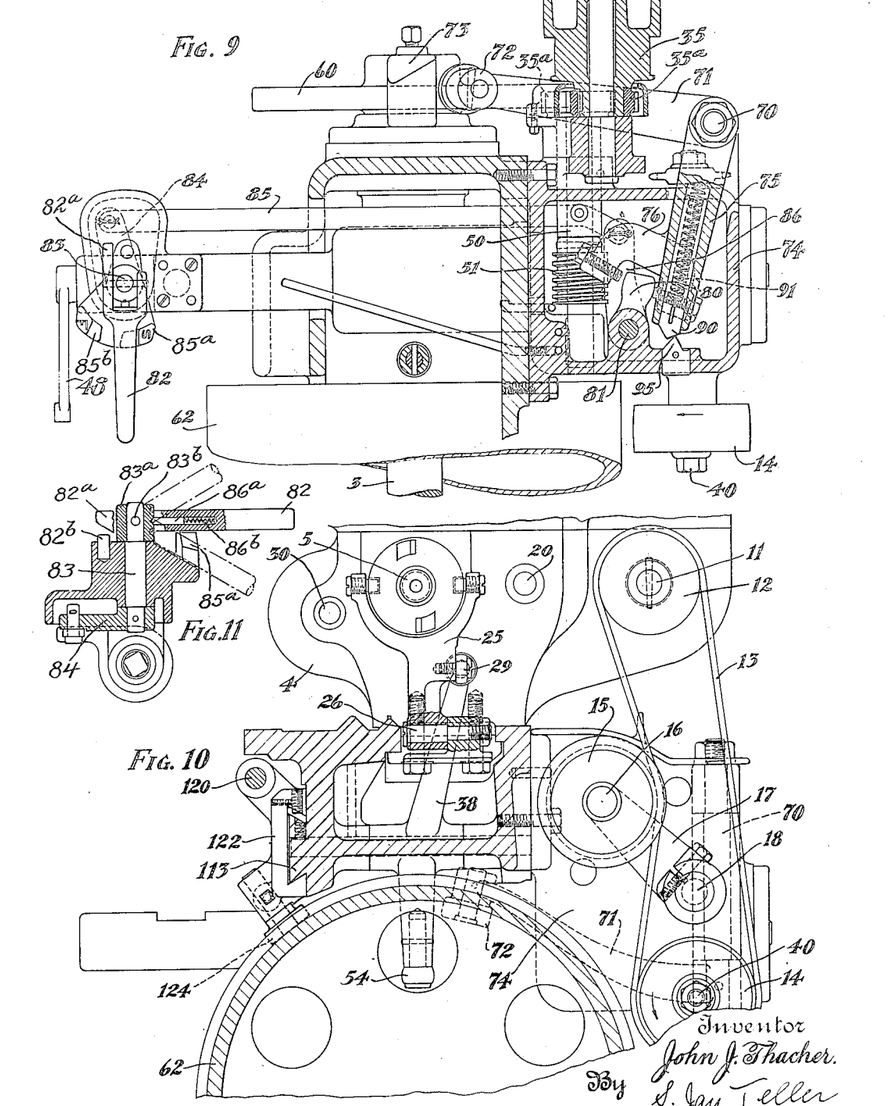
Fig. 9 a sectional view showing the controlling means and cam shaft operating means for the machine taken on line 9—9 of Fig. 2.
Fig. 10 a sectional view taken on line 10—10 on Fig. 1 showing a part of the driving mechanism for the cam shaft.
Fig. 11 is a detail elevation of the control handle taken in section.

The mechanism for throwing the high or low speed of the main cam shaft operating mechanism into and out of operation will now be described. The driving means for both the low and high speed for operating the cam shaft 3 have already been described, the position of the clutch 44 in its forward or rearward position determining the speed at which the cam shaft 3 is rotated. To move this clutch member 44 forward or back a shaft 70 is provided preferably rotatably mounted as shown in Fig. 2 to an extension 74 made fast to the base 2 and having lever arms at its upper and lower end. One of its lever arms 71 carries a friction roller 72 adapted to contact with the adjustable cams 73 on the cam plate 60 mounted on one end of the cam shaft 3. At the other end of shaft 70 is a lever 75 presently to be more fully described. Referring to Fig. 9, the cam roller 72 is about to engage one of the adjustable cam members 73 to throw the clutch 44 into its rearward position. It is to be understood that the adjustable cams 73 may be placed in position any where along the periphery of the cam plate 60 and are of two types, one arranged to throw the bell crank lever 70 and therefore the clutch 44 in one direction and the other type having an oppositely inclined cam surface to return it to its original position.

The other arm 75 of the crank lever shaft 70 is provided with a lateral branch or offset 76. The clutch operating lever 80 is retained between the arm 75 and this offset 76 and is fastened in any suitable way to the clutch operating shaft 81, oscillation of which moves the clutch 44 to its forward or rear position. The projection or offset 76 is provided with an adjustable set screw and the bell crank arm or lever 75 also, so that lost motion between the arm 75 and clutch lever 80 may be allowed and the position of lever 80 adjusted. Preferably a spring pressed plate 90 is resiliently pressed outward by the spring 91 extending longitudinally in the bell crank lever 75, the spring pressed plate 90 being pointed at its end as shown and engaging either side of the pointed plate 95 mounted adjacent the plate 90 in the housing 74 for the above described mechanism.

From the above described mechanism it will be seen that means have been provided for rotating the main cam shaft 3 at different speeds, the low speed of the cam shaft 3 being utilized only when the cutting operation is taking place on the blank, the remaining operations being performed when the cam shaft 3 is operated at its high speed.

Mechanism is provided to throw the clutch 44 to its forward or rearward operative position by hand so that the operator while setting up the machine may by simply positioning a handle 82 operate the cam shaft 3 by its power driving means at its high or low speed.

The handle 82 is attached to a pivoted shaft 83 to the lower end of which is attached a short crank 84. Oscillation of the handle 82 and consequently of crank 84 moves a reach arm 85 forward or back. The arm 85 at its rearward end is pivoted to a crank 86 on the oscillating member 80 so that oscillation of the crank 86 serves to oscillate the member 80 about shaft 81 and with it move the clutch member 44 into either of its operative positions.

The handle 82 is preferably connected to the short shaft 83 so that it may be tilted to the positions shown in Fig. 11. This I accomplish by pivotally fitting the handle member 82 to a collar 83$^a$ which is fastened in any suitable way to the short shaft 83. As shown a pin 83$^b$ extends through short shaft 83, collar 83$^a$ and the handle 82. The handle 82 is provided with an extension 82$^a$ extending to the opposite side of the short shaft 83, this being shown clearly in Fig. 11. A pin 82$^b$ is mounted within the body member or housing for the handle so that with the handle 82 in its elevated position, the extension 82$^a$ will strike this pin 82$^b$ but in its horizontal and depressed positions will pass over pin 82$^b$. It will be seen, therefore, that with the handle raised at any time, the operation of the machine will not be effected until one of the rollers 72 strikes one of the cams 73. At that time, the handle 82 will be oscillated about the shaft 83 through reach arm 85. As soon, however, as the extension 82$^a$ strikes the pin 82$^b$, the handle will be held stationary and as this is in the mid or neutral position of the control handle 82, the machine will be stopped and held from starting until the handle is depressed again.

I also provide projections 85$^a$ and 85$^b$ on the body member or housing having sloping sides as shown in Fig. 11 so that when it is desired to stop the operation of the machine quickly, it is only necessary to depress the handle 82, the sloping sides of either projection 85$^a$ or 85$^b$ serving to force the handle 82 toward its central or neutral position from either operative position.

To hold the handle 82 in any one of the three positions indicated in Fig. 11, I provide a detent comprising a small plunger 86$^a$ forced toward the collar 83$^a$ by a suitable spring 86$^b$. This plunger 86$^a$ is adapted to engage slight depressions formed in the collar 83$^a$ thus holding the handle in one of the positions as shown but permitting easy removal to any other position.

From the above it will be seen that a single means has been provided comprising a handle 82 which will permit the stopping of the machine either instantaneously or after the machine has accomplished a part of its cycle of operations.

The work engaging and rotating member comprises a floating chuck 6 which is preferably similar to that shown in the Müller Patent 1,187,920, granted June 20, 1916, and is operated by moving the friction member 27 into and out of contact with the clutch teeth 28 by means of a lever 25. The operation of the friction member 27 and the operative parts of the chuck 6 are in every way similar to the operation described in the above mentioned patent, and for that reason further explanation will be unnecessary. The mechanism for controlling the movements of the friction member 27 is, however, somewhat different and will therefore be described in detail. The chuck operating lever 25 which at its upper end partly surrounds the friction member 27, is pivoted at its lower end to a pin 26 mounted in the lathe bed 1 and has attached thereto an operating lever or rod 29 preferably spring pressed in one direction by a coiled spring 29$^a$, this spring being strong enough to force the friction member 27 into engagement with the clutch teeth 28 on the chuck 6 when the rod 29 is free to move slightly to the right.

This operating arm or rod 29 is provided with a sleeve 36 preferably threaded at its outer end and engaging the threaded end of rod 29 and adapted to be secured in position by a lock nut 37 provided on the rod 29 in any adjusted position.

A pivoted lever 38 at its upper end is adapted to contact with the rod 29 and sleeve 36. This pivoted lever 38 is rigidly mounted in the base on a suitable pivot 39 and its lower end provided with a roller 54 in engagement with the side face of the cam 61. This cam 61 during a part of its periphery holds the chuck operating lever 25 in the position shown in Fig. 1, that is, out of contact with the clutch teeth 28 on the chuck 6. This is the position of the lever 38 and friction member 27 during the cutting operation. During the remainder of its periphery, however, this cam allows the lever 28 to oscillate slightly and the clutch operating lever 25 is thus moved to the right by means of the coiled spring 29$^a$ above described which serves to open the chuck 6 as described in the above mentioned patent.

By means of the sleeve 36 and its engagement with the pivoted lever 38 I am enabled to conveniently adjust the location of the friction means 27 relative to the chuck teeth 28 and to limit the action of the coiled spring by merely adjusting the position of the sleeve 36 on the rod 29.

My improved blank transferring means for automatically placing a new blank in position to be operated on comprises a bracket 100 forming a base for the transfer mechanism conveniently attached to the rear wall of the lathe body by means not shown and provided with a suitable surfaced portion on its upper side to which the parts of the blank holding and carrying means may be attached. On this bracket is mounted a pair of magazine supports 101 adjustable longitudinally on the bracket 100, and each having a pair of flanged members 102 provided with angle portions which, by rotating a knurled screw 104, may be adjusted to hold blanks of different diameters between the angle portions of the flanged members 102.

Figures 5, 6, 12:
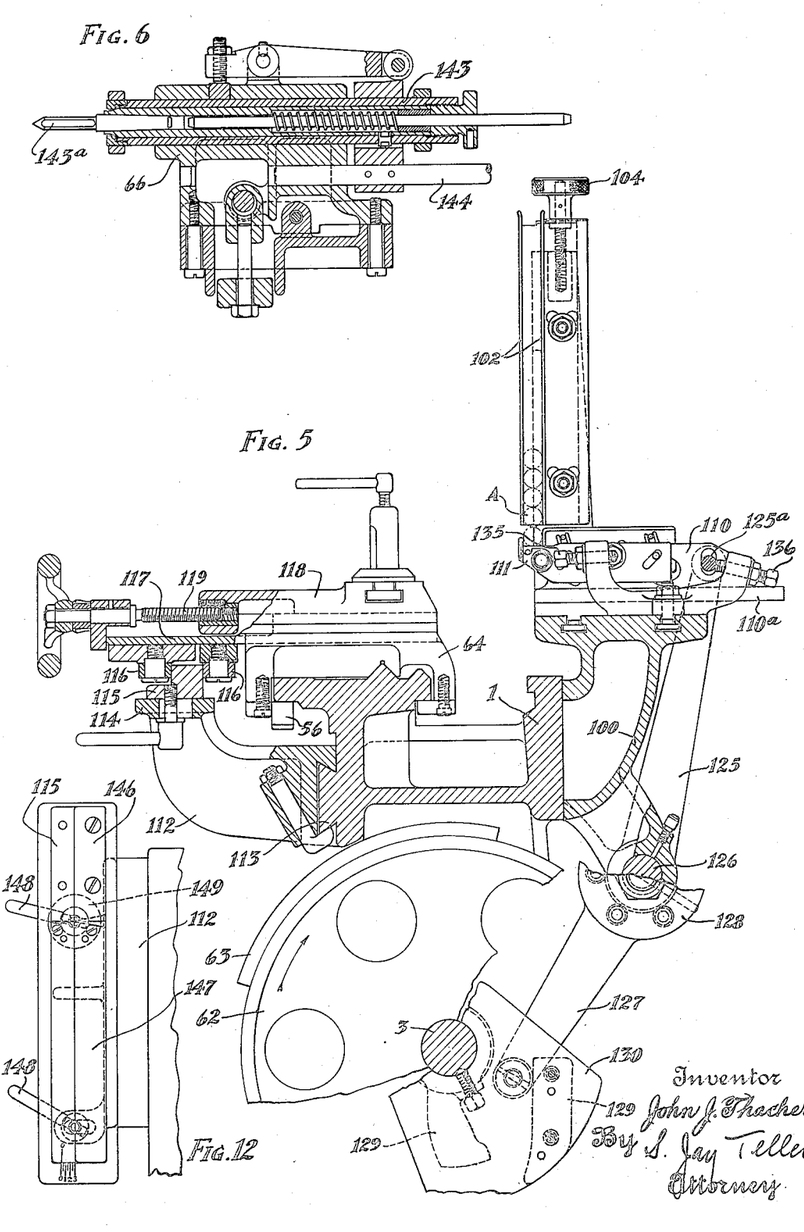
Fig. 5 a vertical section taken along line 5—5 of Fig. 1 showing the blank transferring mechanism.
Fig. 6 a sectional elevation of the tailstock used in connection with my machine.
Fig. 12 is a plan view of the taper bar attachment.

Directly below and between the magazine supports is a blank carrier 110. This comprises a pair of members 110 slidable forward and rearward relative to the bed of the lathe on the bracket 100 and provided at their forward ends with a lip member 111 to prevent the blanks A from falling from the carrier during the forward movement of the carrier. The carrier members 110 may be slidably mounted as shown in a body members 110$^a$ which may be fastened to the bracket 100 at any position along the bracket 100 dependent upon the length of the blanks being operated on. The carrier is operated forward and back by means of suitable levers 125 keyed or otherwise secured to the oscillating shaft 126 mounted horizontally of the bed and in the rear of the machine. The oscillation of shaft 126 is accomplished by means of a lever 127 engaging the oscillating shaft 126 above described by means of a friction clutch 128 as shown clearly in Fig. 2. This latter lever 127 engages adjustable cams 129 provided on a cam plate 130 mounted upon and rotatable with main cam shaft 3. The oscillation of cam lever 127 is sufficient to oscillate the shaft 126 and the levers 125 attached to the carrier 110 a little more than the necessary amount. Adjusting screws 135 and 136 mounted forward of and rearward of the limit of movement of the lever 125 are provided for stopping the blank carrier 110 at exactly the proper position at the end of the forward and rearward movement. Any operation, therefore, of the carriers 110 from the position shown in Fig. 5 is forwardly until the lower blank is directly in alignment with the lathe centers. As soon as this position is reached the shaft 125$^a$ extending through the carriers 110 engages the forward adjusting screw 135 and prevents further movement of the carriers 110. Additional movement of the cam lever 127 simply serves to rotate slightly the friction clutch 128 about the oscillating shaft 126. In the position shown in Fig. 5 the carrier members 110 have just been returned to their rearward position by the cam strip 129. Continued rotation of the cam shaft 3 and cam plate 130 further oscillates operating lever 127 but causes no movement of the carriers 110 as the friction member 128 permits the lever 127 to slip around the shaft 126 as soon as the carrier shaft 125$^a$ engages the stop 135 or 136.

The tool carriage and mechanism for reciprocating it will now be described. The tool carriage 64 is slidably mounted on appropriate ways provided on the top surface of the lathe bed 1 and slides in the same manner as a tool carriage on an engine lathe. Preferably I mount, in connection with the tool carriage, a taper bar attachment (see Fig. 5) or other templet which comprises a bracket 112 secured to a dovetailed projection 113 extending the length of the lathe bed 1, and on the top surface 114 of this bracket is adjustably secured by means of clamping screws a taper bar 115 fitting between rollers 116 mounted in the cross slide 117 of the tool carriage 64. Should it be desired to dispense with the taper bar as for instance when the machine is to be used only for cylindrical work it is only necessary to unclamp the bracket from the dovetail projection, thus removing the bracket 112 and taper bar 115 from the dovetail projection 113. The tool carriage 64 may then be operated by clamping the cross slide 117 rigidly to the tool carriage 64 in any convenient manner not shown.

The tool carrying slide 118 may be adjusted in the usual manner by means of the feed screw 119 as shown. In order to reciprocate the tool carriage 64 it is provided at one end with a rod 120 secured thereto and extending longitudinally of the lathe bed 1. This, as shown, is conveniently mounted just above the longitudinal dovetail projection 113 on the lathe bed and has a pair of adjustable stops 121 mounted thereon. Slidably mounted on the longitudinal projection 113 is a plate or slide 122, as shown, carrying a projection 123 on its upper surface preferably entirely enclosing the lathe carriage rod 120, but, if desired, this projection may simply extend to and come in contact with the stops 121 which may be readily adjusted along the tool carriage rod 120. This plate 122 also carries a friction roller 124 mounted on its lower surface and coming into close contact with the periphery of the drum 62 mounted on the cam shaft 3. The drum as above described is provided with strip cams 63 which, if desired, may be adjusted laterally about the periphery of the drum 62 and which contact with and operate the plate 122 by means of the friction roller 124.

From the above description it will be seen that by rotation of the cam shaft 3 and the drum 62 the plate or slide 122 will be operated to the right or left dependent upon the disposition of the adjustable strip cams 63 on the drum 62. For convenience and to avoid the necessity of a multiplicity of different cams for this drum 62 I preferably use one set of cams 63, as shown in Fig. 1, which reciprocate the plate 122 the maximum distance of the tool carriage movement and regulate the movement of the tool carriage 64 by adjusting the position of the stops 121 on the tool carriage rod 120.

The tool carriage 64 is also provided with a rack 56 bolted to its under surface and meshing with a pinion 57 horizontally mounted in a plate 58 clamped to the lathe bed dovetail 113 as shown. This pinion may be operated by a suitable wrench engaging the squared ends 59 of the pinion shaft to position the lathe carriage 64 when the machine is being first set up.

In the use of this machine for small tools for which it has been specially designed, it is frequently desired to cut a portion of the length of the blank tapered and the remainder cylindrical. To accomplish this in a single movement of the tool carriage a particular form of taper bar or templet attachment is made use of which constitutes an important part of the present invention.

Referring again to Fig. 5 and also to Fig. 12 it will be seen that the taper bar is made up of two main parts namely 146 which is fastened rigidly to the taper attachment bracket 112 preferably near one end of the bracket 112, and 147 which is mounted pivotally on the part 146.

To fasten the pivoted member or extension 147 to the bracket, clamps 148 are provided one of which is located at the pivot and the other near the opposite end of the member 147.

The pivot about which the member or extension 147 may be adjusted is preferably attached to member 147 and is in the form of a circular disk 149 extending about half its diameter into a recess provided in the lower surface of the bar 146. The rearward edges of the parts 146 and 147 are slightly cut away as shown thus permitting adjustment of the member 147. These cut away parts in order to prevent the rearward roller 116 from entering the space formed between the members 146 and 147 are overlapped so that there is always a continuous bearing on the taper bars 146 and 147 for this roller 116.

As shown in Fig. 12 the portion of the attachment rigidly fastened to the bracket 112 is positioned parallel with the line of movement of the tool carriage 64 so that a cylindrical cut may be taken on the blank directly adjoining a taper portion.

If desired the taper attachment may be retained in its operative position as shown when only cylindrical work is being operated on by merely setting and clamping the member 147 in its zero position as shown by a scale mounted on the bracket 112. The attachment may however be removed from the machine, and by locking the cross slide 117 to the carriage 64 cylindrical work may be equally conveniently turned.

The above description has been limited to the use of the particular taper bar shown and described but it is obvious that any suitable templet may take the place of the members 146 and 147 dependent upon the particular type of work being operated on.

The tailstock operating mechanism comprises a cam 65 as shown mounted on the end of the main shaft 3. Preferably the cam 65 comprises an annular groove 65ª about the periphery of the drum in which is retained a lug or projection 142 provided on the operating member 141 secured to a stud 140 outstanding from the extreme end of the lathe bed 1. Attached to the upper end of said operating member 141 is a rod 144 which may be secured in any adjustable position to the operating member 141. This rod 144 serves to operate the tailstock spindle 143 and the tailstock clamping device. Preferably, I use the tailstock described in patent to Müller 1,318,223, granted October 7, 1919, the operation being in every way identical with the operation of the tailstock as described in this patent. The tailstock spindle 143 is provided as usual with the dead centre 143ª on which one end of the blank being operated on is supported and rotated.

From the above description taken in connection with the patent to Müller 1,252,928, it is thought that the operation of the automatic machine will be understood. However, a short description of the operation of the machine will be given.

With the parts as shown in Fig. 1 the tool carriage 64 has just completed its cutting movement and been returned to its initial or starting position and the completed blank has just been dropped from the centers. Movement of the cam shaft 3, which at this time is operating at its high speed, has rotated cam 65 until the offset portion of the groove 65ª has caused the arm 141 to have moved toward the right and back again thus removing the tail stock center from the blank and returning it when a new blank has been presented. Simultaneously with this movement of the arm 141 and tailstock centre 143ª to the right, cam 61 allows the pivoted lever 38 to oscillate slightly so that the arm or rod 29 moves to the right and causes the friction member 27 to engage the clutch teeth 28 on chuck 6. This opens the chuck jaws and allows the blank to fall from the machine.

As soon as the blank has been removed from the centers and while the tailstock centre 143ª is in retracted position the operating lever 127 of the transfer mechanism is oscillated by means of cam 130 thus moving the blank carriers 110 forwardly to position a new blank in alignment with the floating chuck 6 and tailstock center 143ª.

These operations take place before the end of the offset portion of the cam 65 engages the roller 142. As soon as a new blank has been positioned as above described the cam 61 moves the rod 29 to the left to the position as shown in Fig. 1, thus allowing the chuck jaws to automatically close and grip the new blank. While this is taking place the tailstock spindle 143 is moved up into position by the oblique portion of the groove 65ª, thus moving the blank into engagement with the live centre 5ª and clamping the tailstock spindle 143 in place.

The clamping of the tailstock centre takes place simultaneously while being brought into position. As soon as this operation of the tailstock centre is complete the carriers 110 which have remained in their forward position until these operations have been completed move back again to the position shown in Fig. 5. The movement of the slide 122 starts as soon as the roller 124 engages the advance side of the lower cam strip 63 on the drum 62 and the cutting operation starts as soon as the projection 123 engages the adjustable stop 121. It is therefore desirable to delay throwing the lever 71 to operate the cam shaft 3 at its lower speed until the instant that the cutting operation begins for the reason that time may be saved. The cams 73 are so timed in relation to the movement of slide 122 that as soon as this slide 122 engages the adjustable stop 121 and movement of the tool carriage 64 begins the clutch 44 is thrown so that the cam shaft 3 is rotated at its slower speed.

What I claim is:

1. An automatic lathe comprising in combination, a base, attaching means extending along said base, a tool carriage operating slide on said attaching means, and a support for a taper attachment detachably mounted on said attaching means.

2. An automatic lathe comprising in combination, a base, attaching means extending horizontally along the front of said base, a tool carriage operating slide on said attaching means, and a support for a taper attachment detachably mounted at any point along said attaching means.

3. An automatic lathe comprising in combination, a base, attaching means extending along said base, a tool carriage operating slide on said attaching means, cam operated means to reciprocate said slide, a support for a taper attachment adjustably mounted on said attaching means, and a taper attachment adjustably mounted on said support.

4. An automatic lathe comprising in combination, a base, attaching means extending entirely along the vertical front surface of said base, a tool carriage operating slide on said attaching means, cam operated means to reciprocate said slide, a support for a taper attachment adjustably mounted on said attaching means, and a taper attachment adjustably mounted on said support.

5. An automatic lathe comprising in combination, a base, attaching means extending along said base in a direction parallel to the upper surface thereof, a tool carriage operating slide on said attaching means, and a support for a taper attachment adjustable along said attaching means and detachably fastened thereon, whereby a tool mounted on said carriage may have its position controlled longitudinally and transversely of said base by means mounted on said attaching means.

6. An automatic lathe comprising in combination, a base, attaching means extending along said base in a direction parallel to the upper surface thereof, a tool carriage operating slide on said attaching means, and a bracket support for a taper attachment having a plane upper surface for said taper attachment adjustable along said attaching means and detachably fastened thereon, whereby a tool mounted on said carriage may have its position controlled longitudinally and transversely of said base by means mounted on said attaching means.

7. A controlling mechanism for automatic machines comprising in combination, a controller handle, a clutch member operated thereby adapted to operate the machine at a high or low speed, cam plates mounted adjacent said handle whereby a force applied to said handle in one direction will move said clutch to neutral position, and means controlled by said handle to move said clutch to neutral at the end of the cycle of operations of said machine.

8. A controlling mechanism for automatic machines comprising in combination, a controller handle, a clutch member operated thereby adapted to operate the machine at a high or low speed, and cam plates mounted adjacent said handle whereby when said handle is depressed while in either of its operative positions said clutch member will be moved to its inoperative or neutral position, and when said handle is raised said clutch member will not be moved to neutral position until the end of the high or low speed of operation.

9. A controlling mechanism for automatic machines comprising in combination, a controller handle, a clutch member operated thereby adapted to operate the machine at a high or low speed, cam plates mounted adjacent said handle whereby when said handle is depressed while in either of its operative positions said clutch member will be moved to its inoperative or neutral position, and when said handle is raised said clutch member will not be moved to neutral position until the end of the high or low speed of operation, and means to hold said handle in either its depressed or raised position.

10. A controlling mechanism for automatic machines comprising in combination, a clutch having two operative positions to operate a cam shaft at different speeds, a lever to move said clutch, a handle, means connecting said handle with said clutch lever whereby oscillation of said handle in a horizontal plane will control the position of said clutch, a stop member for said handle normally out of the path of movement of said handle but engaged by said handle when said handle is oscillated to an oblique position to stop the operation of said cam shaft at the end of its faster or slower movement.

11. A controlling mechanism for automatic machines comprising in combination, a handle pivoted about two axes, means controlled by movement of said handle about one axis acting directly to stop or start the operations of the machine, means operated by movement in one direction about the second axis constraining the handle to directly move about the first axis, and means controlled by movement of said handle in the opposite direction about the second axis serving to stop the operations of the machine at predetermined times in its cycle of operations.

12. An automatic lathe comprising in combination, a headstock, a driving shaft therein, work spindle speed change gears between said shaft and spindle, a main cam shaft, means connected with said driving shaft for operating said cam shaft at a speed proportional to the speed of the driving shaft, and means connected to said work spindle for operating said cam shaft at speeds proportional to the speed of the work spindle and at speeds materially lower than the first mentioned speed.

13. A blank transferring and positioning means for automatic machines comprising in combination, a blank holding magazine, a blank carrier mounted adjacent thereto, a lever to reciprocate said carrier into and out of loading position, stop members engaging the carrier at its extreme forward and rear positions, an oscillating shaft attached to said lever, and an operating lever frictionally engaging said oscillating shaft to reciprocate said carrier.

14. A blank transferring and positioning means for automatic machines comprising in combination, a blank holding magazine, a blank carrier mounted thereunder, a lever to reciprocate said carrier, adjustable stop members engaging the carrier at its extreme forward and rear positions, an oscillating shaft attached to said lever, and an operating lever frictionally engaging said first named lever to reciprocate said carrier.

In testimony whereof, I hereto affix my signature.

JOHN J. THACHER.